US008526385B2

(12) United States Patent
Berggren et al.

(10) Patent No.: US 8,526,385 B2
(45) Date of Patent: Sep. 3, 2013

(54) METHOD FOR GENERATING REFERENCE SIGNALS

(75) Inventors: Fredrik Berggren, Kista (SE); Jianghua Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 191 days.

(21) Appl. No.: 13/196,667

(22) Filed: Aug. 2, 2011

(65) Prior Publication Data
US 2011/0286423 A1    Nov. 24, 2011

Related U.S. Application Data

(63) Continuation of application No. PCT/CN2009/071454, filed on Apr. 24, 2009.

(51) Int. Cl.
*H04W 4/00* (2009.01)
*H04B 7/00* (2006.01)

(52) U.S. Cl.
USPC ............ 370/329; 370/328; 370/338; 455/509

(58) Field of Classification Search
USPC .......... 370/328, 329, 330, 331, 344; 455/509
See application file for complete search history.

(56) References Cited

U.S. PATENT DOCUMENTS

| | | | | |
|---|---|---|---|---|
| 5,862,142 A | * | 1/1999 | Takiyasu et al. | 370/480 |
| 6,275,518 B1 | * | 8/2001 | Takahashi et al. | 375/135 |
| 6,845,123 B1 | * | 1/2005 | Nyberg et al. | 375/133 |
| 7,715,845 B2 | * | 5/2010 | Jin et al. | 455/447 |
| 7,940,740 B2 | * | 5/2011 | Krishnamurthy et al. | 370/344 |
| 8,416,835 B2 | * | 4/2013 | Ahn et al. | 375/132 |
| 8,442,566 B2 | * | 5/2013 | Liu et al. | 455/509 |
| 2005/0002369 A1 | * | 1/2005 | Ro et al. | 370/342 |

(Continued)

FOREIGN PATENT DOCUMENTS

| | | |
|---|---|---|
| CN | 101365232 A | 2/2009 |
| WO | WO 2008057898 A2 | 5/2008 |
| WO | 2008/094014 A2 | 8/2008 |
| WO | 2008/137777 A1 | 11/2008 |

OTHER PUBLICATIONS

"DL RS Designs for Higher-Order MIMO" Samsung. 3 GPP TSG RAN WG1 #56. Athens, Greece, Feb. 9-13, 2009.

(Continued)

*Primary Examiner* — Ian N Moore
*Assistant Examiner* — Jenee Alexander
(74) *Attorney, Agent, or Firm* — Brinks Hofer Gilson & Lione

(57) ABSTRACT

The present disclosure relates to a method for generating reference signals in a cellular wireless communication system having a set of resource blocks. Each resource block includes a plurality of resource elements. Each reference signal is associated with an antenna port in a cell. At least one reference signal in a cell is transmitted on at least one resource element only in resource blocks belonging to a subset of said set of resource blocks. The method includes shifting frequency in the resource blocks in the subset of resource blocks. The frequency shifting of the resource blocks belonging to said subset of resource blocks is cell-specific and is determined from an integer sequence having a length less than or equal to a total number of cell identities in said cellular wireless communication system. The disclosure also relates to methods and devices for transmitting and receiving such reference signals; and to a device for generating reference signals.

13 Claims, 3 Drawing Sheets

| | | | | |
|---|---|---|---|---|
| ▨ | RE for RS of antenna port 0 | | ■ | RE for RS of antenna port 4 |
| ▩ | RE for RS of antenna port 1 | | ▦ | RE for RS of antenna port 5 |
| ⊞ | RE for RS of antenna port 2 | | ▩ | RE for RS of antenna port 6 |
| ☷ | RE for RS of antenna port 3 | | ▨ | RE for RS of antenna port 7 |

(56) References Cited

U.S. PATENT DOCUMENTS

| | | | |
|---|---|---|---|
| 2005/0100078 A1* | 5/2005 | Nyberg et al. | 375/133 |
| 2007/0064730 A1* | 3/2007 | Jin et al. | 370/468 |
| 2007/0177631 A1* | 8/2007 | Popovic et al. | 370/478 |
| 2008/0089390 A1* | 4/2008 | Picard | 375/132 |
| 2008/0310540 A1* | 12/2008 | Tiirola et al. | 375/267 |
| 2009/0067370 A1* | 3/2009 | Kim et al. | 370/328 |
| 2009/0270122 A1* | 10/2009 | Chmiel et al. | 455/550.1 |
| 2010/0035600 A1* | 2/2010 | Hou et al. | 455/422.1 |
| 2010/0062783 A1* | 3/2010 | Luo et al. | 455/450 |
| 2010/0074191 A1* | 3/2010 | Lee et al. | 370/329 |
| 2010/0103906 A1* | 4/2010 | Montojo et al. | 370/335 |
| 2010/0104034 A1* | 4/2010 | Nam et al. | 375/260 |
| 2010/0118998 A1* | 5/2010 | Baker et al. | 375/260 |
| 2010/0173660 A1* | 7/2010 | Liu et al. | 455/501 |
| 2010/0189032 A1* | 7/2010 | Chen et al. | 370/328 |
| 2010/0189038 A1* | 7/2010 | Chen et al. | 370/328 |
| 2010/0195748 A1* | 8/2010 | Nam et al. | 455/509 |
| 2010/0246515 A1* | 9/2010 | Tsai et al. | 370/329 |
| 2010/0284363 A1* | 11/2010 | Ahn et al. | 370/330 |
| 2011/0092231 A1* | 4/2011 | Yoo et al. | 455/501 |

OTHER PUBLICATIONS

"Support of DL Higher-Order MIMO Transmission in LTE-Advanced" NTT DOCOMO . 3 GPP TSG RAN WG1 Meeting #55. Prague, Czech Republic. Nov. 10-14, 2008.

International Search Report issued in corresponding PCT Application No. PCT/CN2009/071454, mailed Feb. 4, 2010.

Office Action issued in corresponding European Patent Application No. 09843539.9, mailed Oct. 17, 2012.

Office Action issued in corresponding European Patent Application No. 09843539.9, mailed Mar. 1, 2013.

Motorola, "Common Reference Symbol Mapping/Signaling for 8 Transmit Antennas" Agenda Item 11.3, 3GPP TSG RAN1 #55. Prague, Czech Republic, Nov. 10-14, 2008. R1-084408.

Texas Instruments, "Common Reference Symbol Mapping/Signaling for 8 Transmit Antenna" Agenda Item 12.5, 3GPP TSG RAN WG1 #55bis. Ljubljana, Slovenia, Jan. 12-16, 2009. R1-090288.

Office Action issued in corresponding Chinese Patent Application No. 200980154404.3, mailed Jan. 5, 2013.

Extended European Search Report issued in corresponding European Patent Application No. 09843539.9, mailed May 8, 2012.

Written Opinion of the International Searching Authority issued in corresponding PCT Patent Application No. PCT/CN2009/071454, mailed Feb. 4, 2010.

Samsung, "Frequency Shift Definition for UE-Specific Downlink RS" Change Request Version 8.3.0, 36.211 CR 044. 3GPP TSG RAN WG1 #53bis. Warsaw, Poland, Jun. 30-Jul. 4, 2008. R1-082305.

Samsung, "Frequency Shifting of UE-Specific RS" Change Request Version 8.3.0, 36.211 CR 0048. 3GPP TSG-RAN Meeting #53bis. Warsaw, Poland, Jun. 30-Jul. 4, 2008.R1-082588.

Huawei, "Cell-specific Integer Sequences for Frequency Positioning of DL RS on Subframe Basis" Agenda 6.6.1 Downlink Reference Signals, TSG RAN WG1 meeting #47bis. Sorrento, Italy, Jan. 15-19, 2007. R1-070532.

* cited by examiner

| | RE for RS of antenna port 0 | | RE for RS of antenna port 4 |
| | RE for RS of antenna port 1 | | RE for RS of antenna port 5 |
| | RE for RS of antenna port 2 | | RE for RS of antenna port 6 |
| | RE for RS of antenna port 3 | | RE for RS of antenna port 7 |

METHOD FOR GENERATING REFERENCE SIGNALS

CROSS-REFERENCE TO RELATED APPLICATION

This application is a continuation of International Application No. PCT/CN2009/071454, filed on Apr. 24, 2009, which is hereby incorporated by reference in its entirety.

FIELD OF DISCLOSURE

The present disclosure relates to a method for generating reference signals for a cellular wireless communication system. Furthermore, the present disclosure also relates to a method for transmitting, and a method for receiving, such reference signals; and to a device for generating reference signals, and to a device for transmitting, and a device for receiving, such reference signals.

BACKGROUND

Cellular wireless communication systems typically rely on coherent detection and link adaptation. For this, the receiver must be able to estimate the channel and possibly report back channel quality information. Hence, Reference Signals (RSs) known by the receiver, are provided by the transmitter to enable channel estimation in the receiver. Contemporary systems, such as Long Term Evolution (LTE) communication system, utilize Common cell-specific RSs (CRS) in the downlink, which are used both for demodulation purposes and for various channel quality estimations, such as Channel Quality Indicator (CQI), Precoding Matrix Index (PMI) and Rank Indicator (RI).

One CRS defines a so called antenna port; and one, two or four antenna ports are supported in the LTE downlink. The antenna ports can be mapped to actual physical antennas in a proprietary manner, which is an implementation issue and not standardized. The CRS structure in one Resource Block (RB) is illustrated in FIG. 1 where a RB is defined as Nsymb consecutive OFDM symbols in the time domain and Nsc consecutive subcarriers in the frequency domain. In FIG. 1, each square represents a Resource element (RE), and for example, in LTE one RB may consist of 12×7=84 REs; and there is the same RS structure in each RB in a cell. For the LTE uplink, a different solution is adopted not relying on CRSs. In this solution the RS has been divided into Demodulation RSs (DMRS) and Sounding RSs (SRS), where the former are contained only in the scheduled RBs, while the latter can be transmitted over the whole system bandwidth. With this distinction of two different types of RSs, the RS overhead can be kept on a reasonable level in the system.

As wireless communication systems evolve, additional features are added, for example, more transmit antennas. One such example is LTE-Advanced, which will support eight transmit antennas. Therefore, additional antenna ports which are associated with additional RSs need be defined. Either eight new antenna ports is defined; or four, six or seven new antenna ports are to be defined in addition to the legacy antenna ports, in LTE, to support backwards compatibility.

CRS overhead can become significant for multiple antennas, and therefore in LTE, antenna port two and three were given a RS density which is lower than that for antenna port 0 and 1 in order to reduce the CRS overhead. For the case of four antenna ports in LTE, the RS overhead is about 14%. If the same CRS design methodology is used for eight antenna ports, the CRS overhead will reach to 28%, which is not acceptable for a wireless communication system of this kind.

As the RS overhead will become an issue again for eight transmit antenna configurations, the principle from LTE uplink can be utilized; namely to define a number of low-density CRSs used only for measurements and define DMRS for demodulation purposes. The CRSs are cell-specific and can potentially span the whole system bandwidth, whereas the DMRSs are user equipment (UE) specific and are only present in scheduled RBs. The CRS is sometimes also referred to as a Channel Spatial Information-RS or Channel State Information-RS (CSI-RS). Since the requirements on demodulation performance are more stringent than for channel quality measurements, the RS density of the new CRS could be made much lower than the density of the existing CRS (for example, in LTE). In total, it could thus be expected that the RS overhead could be manageable.

According to a prior art solution, it was proposed that the CRSs for an LTE-Advanced eight transmit antenna system should not be spread over the whole bandwidth as in LTE, but be contained in particular CRS RBs. These CRS RBs should be located in the time- and frequency domain such that sufficient measurement performance can be obtained and their positions are known to the LTE-Advanced UE. It is also proposed that these RBs could shift its frequency position as time progresses, which is denoted as CRS hopping. In that way, the CRS could cover a larger part of the bandwidth over time.

According to another prior art solution, sparse CRSs confined to certain RBs (i.e., CRS RBs) was also considered. To mitigate inter-cell interference, a set of higher-layer configured cell-specific offsets (subcarrier offset, RB offset, subframe offset) is suggested. However, this prior art solution has not considered inter-cell interference mitigation without any assistance of higher-layer signalling, for example, as is the case in LTE.

SUMMARY

An object of the present disclosure is to provide an alternative solution to the problem of generating reference signals for cellular wireless communication systems with multiple antenna ports. Another object of the present disclosure is to provide reference signals giving reduced inter-cell interference between different cells. Yet another object is to provide reference signals which are backwards compatible with reference signals in legacy systems, such as LTE.

According to one aspect of the present disclosure, the aforementioned objects are achieved with a method for generating reference signals in a cellular wireless communication system having a set of resource blocks. Each resource block includes a plurality of resource elements. Each reference signal is associated with an antenna port in a cell. At least one reference signal in a cell is transmitted on at least one resource element only in resource blocks belonging to a subset of the set of resource blocks. The method includes frequency shifting the resource blocks belonging to said subset of resource blocks. The frequency shifting of the resource blocks belonging to said subset of resource blocks is cell-specific and is determined from an integer sequence having a length less than or equal to a total number of cell identities in said cellular wireless communication system.

With a method for generating reference signals according to the present disclosure, the impact of RS-to-RS inter-cell interference can be minimised, and therefore improve channel estimation and/or demodulation of data. The frequency shifting of resource blocks can be implicitly determined from cell identity, and hence high layer signalling can be avoided to simplify the system design. The present method for generating reference signals also facilitates backwards compatibility when designing reference signals for future cellular communication systems, since the impact for legacy UEs is reduced with the present method. The reference signal overhead is also reduced with the present method.

According to another aspect of the disclosure a method in a transmit node for transmitting, and a method in receive node for receiving, reference signals generated according to the methods above are disclosed.

According to yet another aspect of the disclosure the above mentioned objects are achieved with a device for generating reference signals for a cellular wireless communication system having a set of resource blocks. Each resource block includes a plurality of resource elements. Each reference signal is associated with an antenna port in a cell. At least one reference signal in a cell is transmitted on at least one resource element only in resource blocks belonging to a subset of said set of resource blocks. The device has a processor configured to shift frequency in the resource blocks belonging to the subset of resource blocks. The frequency shifting of the resource blocks belonging to said subset of resource blocks is cell-specific and is determined from an integer sequence having a length less than or equal to a total number of cell identities in said cellular wireless communication system.

The device for generating reference signals may further be configured in accordance with the different embodiments of the method for generating reference signals above.

According to yet another aspect of the disclosure a device for transmitting, and a device for receiving, reference signals generated by a device for generating reference signals above are disclosed.

Other advantages and applications of the present disclosure will be apparent from the following detailed description of the disclosure.

BRIEF DESCRIPTION OF THE DRAWINGS

The appended drawings are intended to clarify and explain the present disclosure, in which.

DETAILED DESCRIPTION

Figure 1:
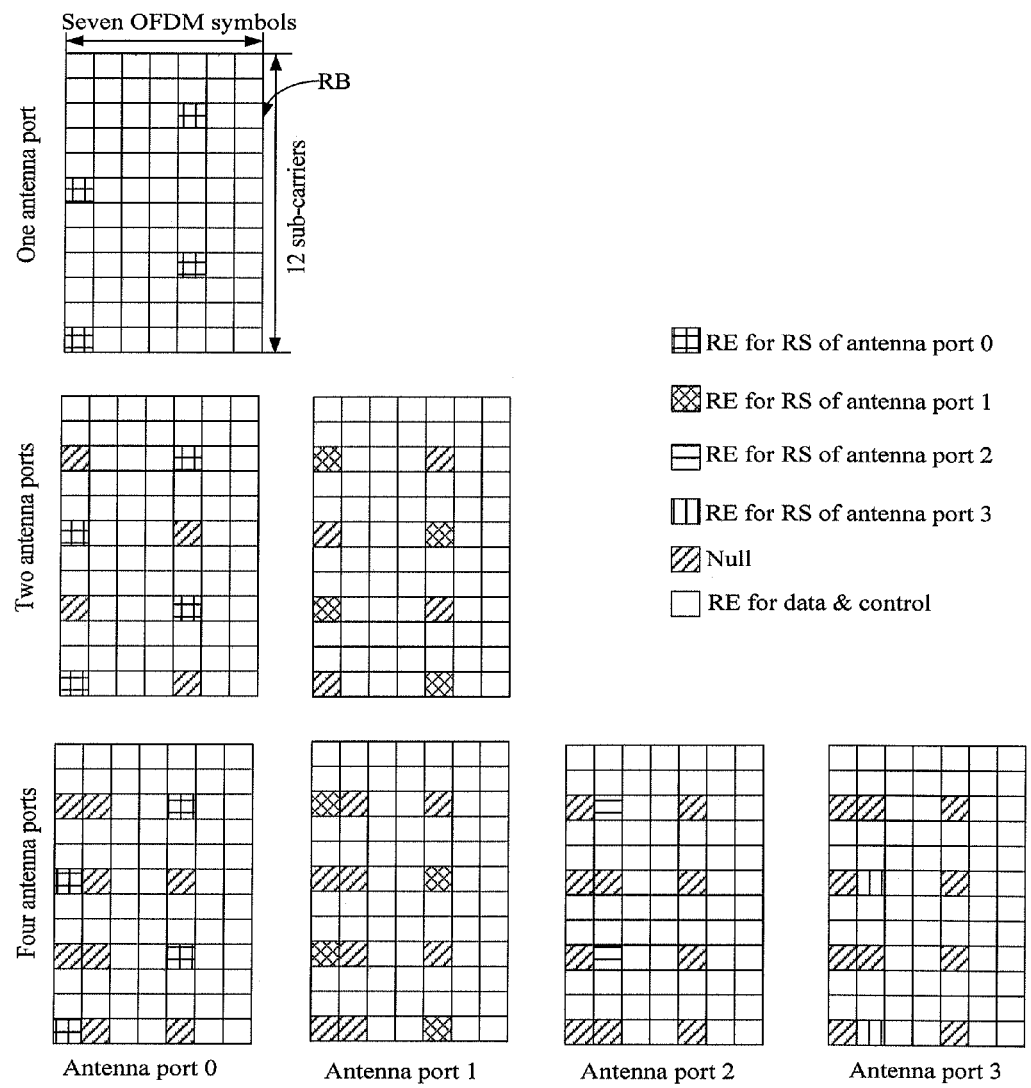
FIG. 1 shows the antenna ports in LTE downlink.

A main issue in RS design for higher order antenna configurations is to keep a low RS overhead but still provide reliable channel estimation (CQI/PMI/RI) and/or demodulation. In order to do that, inter-cell interference among RSs must be minimized, since lower RS density results in less signal energy, which generally makes the measurement performance worse. At the same time, new RSs should incur minimal performance losses to legacy UEs, as backwards compatibility is often crucial. A legacy UE cannot be assumed to know about the presence of additional RSs and will thus treat them as data and try to decode them.

Legacy cellular communications systems, for example, LTE, may have to be extended with RSs for additional transmit antennas, and RS overhead is a problem for large antenna configurations. Thus, low-density RSs should be provided to support additional antenna ports. The CRSs should be transmitted such that there is backwards compatibility, i.e. little impact on legacy UEs and the impact of RS-to-RS inter-cell interference should be minimized.

In LTE, the RSs span the whole system bandwidth and are present in each RB, with a RS resource element (RE) being present in every sixth RE. The RSs for different antenna ports in a cell are orthogonal through Frequency Division Multiplexing (FDM), such that the REs that contain RSs on any antenna port are correspondingly nulled on all other antenna ports. To mitigate RS-to-RS inter-cell interference, a cell-specific RS shift is applied so that the RS pattern is shifted a number of REs in the frequency domain according to $v_{shift}=N_{ID}^{cell} \mod 6$, where $N_{ID}^{cell}$ is the physical cell Identity (ID). Thereby, RS patterns do not overlap if they have different RE shifts. The UE determines the RS shifts directly from the cell ID, and hence no higher-layer configuration is performed.

In the new evolved communication system, there is no signalling defined for legacy UEs (for example, for Rel.8 LTE UEs) to detect that there would be additional RSs in certain RBs. Hence, if legacy UEs are scheduled in such RBs, their data will be punctured by RSs for additional antenna ports, which might have consequences on legacy UE detection performance. However, that impact is dependent on the density of the RSs as well as the chosen Modulation and Coding Scheme (MCS) for the transmission. The base station could select a more robust MCS than the one reported by a UE, which would handle the punctured RB at a cost of lower throughput.

Compared to a RS that is defined over the whole system bandwidth (i.e. in all RBs), having RSs contained in certain RBs according to the disclosure would thus offer more RBs that could be scheduled without any impact to legacy UEs. Given a required RS density, it would thus be beneficial to allocate the RS in as few RBs as possible.

Furthermore, the needed RS density depends on the performance requirements and the channel characteristics. It can be anticipated that transmission with large antenna configurations has its main application for spatial multiplexing and therefore would operate mostly at good channel conditions. Lower RS density per antenna port could therefore be motivated for higher number of antenna ports.

A method for generating RSs for a cellular wireless communication system according to the present disclosure is therefore described. The method is based on the insight that RBs in which RS are transmitted, and which belong to a subset of the total system set of RBs are frequency shifted in a controlled manner. The frequency shifting of the RBs belonging to the subset of RBs should be: cell-specific and further determined from an integer sequence, wherein the integer sequence has a sequence length less than or equal to a total number of cell IDs in the cellular system. The integer sequence is determined from the set of cell identities, and each cell ID will correspond to one element of the integer sequence. If the elements of the integer sequence has one-to-one mapping relation with all the cell IDs, then the length of the integer sequence is the same as the number of cell IDs; or several cell IDs correspond to the same sequence element, which means that the length of the integer sequence will be less than the total number of cell IDs in the system.

Assuming that a number of resource blocks $N_{RB}^{RS}$ can be utilized to include RSs of at least one antenna port in a cell, this number should be smaller than the total number of available RBs in the communication system (corresponding to the total system bandwidth), and these RS RBs may not only contain RSs but also data and DMRSs.

The total RS density in the system depends on the number of RS RBs $N_{RB}^{RS}$ and on the RS density within a RS RB. Either $N_{RB}^{RS}$ is fixed and statically determined during the system design, or possibly signalled to the UE, allowing it to be semi-statically configured in a cell. The value of $N_{RB}^{RS}$ could also be coupled to quantities that the UE can determine (for example, system bandwidth), allowing for different RS density for different bandwidths. It can be further assumed that if a UE knows the number $N_{RB}^{RS}$, there exists a predefined relation so that the UE can determine the set of actual RBs in the system bandwidth that contain the RS, i.e. the UE knows the position of the RS RBs.

Figure 2:
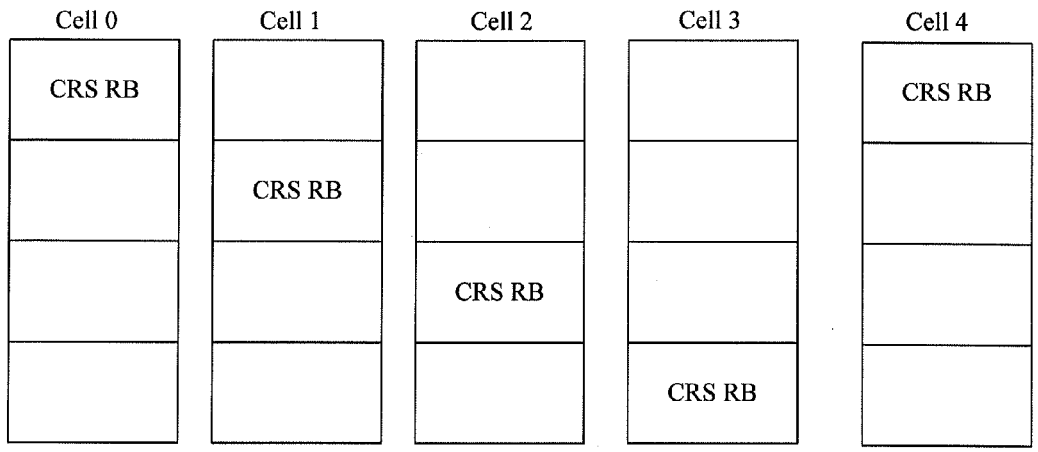
FIG. 2 shows an example of cell-specific frequency shift of RBs for $\bar{v}_{shift}^{RB}=4$.

The cell-specific shift of the RBs that contain the RSs means that different cells use different RBs for RS transmission to reduce inter-cell interference. For instance, if there is one RS RB in every four RB in a cell, a cell-specific frequency shift $v_{shift}^{RB}$ of RS RB could be given by the cell identity $N_{ID}^{cell}$, as $v_{shift}^{RB} = N_{ID}^{cell}$ mod 4, where the shift is on RB level. For the cells with $N_{ID}^{cell}$ equal to 0, 1, 2, 3 and 4, the corresponding RS RB shifts are 0, 1, 2, 3 and 0, which are shown in FIG. 2. It can be observed from FIG. 2 that RS of cell 0 is transmitted in the RBs which are different from cell 1, cell 2 and cell 3, and therefore there would be no RS-to-RS inter-cell interference between cell 0 and cell 1 (or cell 2, cell 3).

The number of RB shifts depends on the granularity of RS RB, i.e. $N_{RB}^{CRS}$. There are $\bar{v}_{shift}^{RB}=4$ RB shifts in the given example. Due to the limited number of RB shifts, some cells will have the same RB shift, i.e. two cells have the same RS RBs such as cell 0 and cell 4 shown in FIG. 2. In this case, there still may be some RS interference between cell 0 and cell 4 if these cells have the same RS position within the RS RBs.

According to an embodiment of the disclosure, cell-specific RS RE shift within a RS RB can be performed in order to further mitigate the inter-cell RS interference, so that, for example, cell 0 and 4 in FIG. 2 still could obtain orthogonal RSs. This embodiment relates to cell-specific RE shift to the RS similarly as is done for the RSs of the legacy system. In LTE this shift is performed $v_{shift}^{RE} = N_{ID}^{cell}$ mod 6, where the shift is on the RE level.

For LTE, the method of cell-specific RS RE shifting was used to mitigate interference problems. By network planning, it is thus possible to allocate the cell IDs such that neighbouring cells use different RS RE shifts. For even better inter-cell interference randomization, the RS RE shifts could vary in time (i.e. RS frequency-hopping), which is not supported for LTE.

Figure 3:
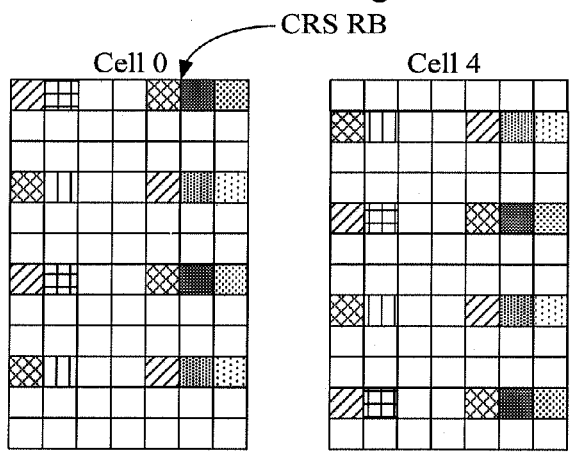
FIG. 3 shows an example of cell-specific frequency shift of REs within a RB.

Furthermore, inter-cell interference mitigation is therefore possible if also the additional RSs can utilize frequency shifts. For example, if we assume a RS pattern for antenna ports 4-7 as shown in FIG. 3, it is also possible for the additional antenna ports 4-7 to utilize the same shifts as the LTE antenna ports 0-3. In this example, antenna ports 0-3 can be assumed to belong to the legacy system, while additional antenna ports 4-7 are examples of four new RSs, for example, for LTE-A. It can be observed that there is no inter-cell RS interference between cell 0 and cell 4 even when they have the same RS RB if their cell IDs are set so that they provide different RS RE shifts within a CRS RB.

According to another embodiment of the present disclosure, the REs are modulated by a RS sequence which is based on the physical cell identity $N_{ID}^{cell}$, so that all cells have unique RSs. In LTE, this is performed by initializing a pseudo-random RS sequence generator as a function of $N_{ID}^{cell}$. If the antenna ports are orthogonal within a cell (cf. FIG. 1) it is possible to use the same RS sequence for all antenna ports in the cell, and the RS should be transmitted in predetermined REs of the RS RBs.

The cell-specific RS RB shifting according to the disclosure reduces the inter-cell interference as RSs with the same cell-specific RS RE shift could still be orthogonal, as they may not be transmitted in the same RS RB. It could further be desirable that:

1. The RS RB shift could be inferred from the cell ID, to avoid explicit signalling (for example, from a base station to a UE).
2. There is an even distribution of the number of cells transmitting their RS in a RS RB.
3. As many RS RE shifts as possible should be supported in a RS RB.

The first point is obvious, i.e. explicit signalling is undesirable since this signalling will increase the system overhead and complexity, i.e. designing signalling transmissions. The second point would make the RS RBs evenly allocated with RSs, such that the RS-to-RS inter-cell interference is roughly similar in any RS RB. The third point stems from the fact that the more cell-specific RS RE shifts that are possible in a RS RB, typically the less impact of RS-to-RS inter-cell interference. For example, if the non-legacy (additional) antenna ports (antenna port 4-7 in FIG. 3) have the same RE shift as the legacy antenna ports (antenna port 0-3 in FIG. 3), the inter-cell interference is reduced the more RE shifts that are available.

Hence, according to yet other embodiments of the method for generating reference signals according to the disclosure, the above points are considered.

Denote the total number of cell IDs in the system by $\bar{N}_{ID}^{cell}$ and the total number of RE shifts by $\bar{v}_{shift}^{RE}$, and let $\bar{N}_{ID}^{cell}=K\bar{v}_{shift}^{RE}$ where K is a positive integer. Then, if $\bar{v}_{shift}^{RB}$ is the total number of RS RB shifts, and $$\bar{N}_{ID}^{cell} = \alpha \bar{v}_{shift}^{RE} \bar{v}_{shift}^{RB} \qquad (1),$$

holds for a positive integer α, it is possible to allocate the same number of RSs to all RS RBs and at the same time allow all RE shifts in all RS RBs, as stated in the above points. Note that equation (1) describes a sufficient condition.

One method to generate the RB shifts according to the above points is to first construct a p-periodic sequence of length $\bar{N}_{ID}^{cell}$ comprising elements $\{0, 1, \ldots, \bar{v}_{shift}^{RE}-1\}$, wherein a sequence $\{x_i\}$ is periodic with period p if $x_i = x_{i+np}$ where $n=1, 2, \ldots$, and the smallest p for which this holds is referred to as the least period. By judiciously selecting the period p, an even distribution of RS to RS RBs and RE shifts to RS RBs could be provided by a one-to-one mapping between this sequence and the set of cell identities. Example of two such mappings are, $$v_{shift}^{RB} = \mathrm{mod}\left(\left\lfloor \frac{N_{ID}^{cell}}{\bar{v}_{shift}^{RE}} \right\rfloor, \bar{v}_{shift}^{RB}\right), \qquad (2)$$

having a least period $p = \bar{v}_{shift}^{RE} \bar{v}_{shift}^{RB}$, and $$v_{shift}^{RB} = \left\lfloor \frac{N_{ID}^{cell}}{\bar{N}_{ID}^{cell}/\bar{v}_{shift}^{RB}} \right\rfloor, \qquad (3)$$

having a least period $p = \bar{N}_{ID}^{cell}$. A mapping that gives a least period $p = \bar{v}_{shift}^{RB}$ is given by $$v_{shift}^{RB} = \mathrm{mod}(N_{ID}^{cell}, \bar{v}_{shift}^{RB}) \qquad (4).$$

Table 1 shows an example of mappings according to equations (2)-(4) for $\overline{N}_{ID}^{cell}=18$, $\overline{v}_{shift}^{RE}=3$ and $\overline{v}_{shift}^{RB}=3$.

TABLE 1

Example of cell-specific RS RB shift mappings

| $N_{ID}^{cell}$ | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| $v_{shift}^{RE}$ | 0 | 1 | 2 | 0 | 1 | 2 | 0 | 1 | 2 | 0 | 1 | 2 | 0 | 1 | 2 | 0 | 1 | 2 |
| $v_{shift}^{RB}$: Eq. (2) | 0 | 0 | 0 | 1 | 1 | 1 | 2 | 2 | 2 | 0 | 0 | 0 | 1 | 1 | 1 | 2 | 2 | 2 |
| $v_{shift}^{RB}$: Eq. (3) | 0 | 0 | 0 | 0 | 0 | 0 | 1 | 1 | 1 | 1 | 1 | 1 | 2 | 2 | 2 | 2 | 2 | 2 |
| $v_{shift}^{RB}$: Eq. (4) | 0 | 1 | 2 | 0 | 1 | 2 | 0 | 1 | 2 | 0 | 1 | 2 | 0 | 1 | 2 | 0 | 1 | 2 |

Mapping according to equation (2) gives a 9-periodic sequence, while mapping according to equation (3) gives an 18-periodic sequence, and mapping according to equation (4) gives a 3-periodic sequence. In this case, equation (4) gives the undesirable result that only RS-RE-shift k is possible for RS-RB-shift k, since the period of (4) is the same as the period of the RE shift sequence contained in row 2. For equations (2) and (3), there is an even RE shift distribution between RB shifts. Note that a sequence of length $\overline{N}_{ID}^{cell}$ is considered to be $\overline{N}_{ID}^{cell}$-periodic if it has no period less than $\overline{N}_{ID}^{cell}$.

In the above example α=2, and for mappings according to equations (2) and (3) we can interpret α as the number of RS collisions in a RS RB. For mapping according to equation (2), cell ID 0 and 9 will have the same RS RB shift as well as the same RS RE shift, i.e. a collision. Mapping according to equation (4) clearly is the worst, resulting in 6 collisions per RS.

In LTE, there are $\overline{N}_{ID}^{cell}=504$ physical cell IDs, and $\overline{v}_{shift}^{RE}=6$ cell-specific RS-RE-shifts. There are thus at least 504/6=84 collisions. From FIG. 1, when the number of antenna ports in the system is one, it can be seen that six RE-shifts generates six non-overlapping RS patters and the number of collisions is exactly 84. When the number of antenna ports is larger than one, the number of collisions increases since effectively only three non-overlapping patterns can be generated.

For example, the RS of antenna port 0 with $v_{shift}^{RE}=0$ overlaps with the RS of antenna port 1 with $v_{shift}^{RE}=3$. If $\overline{v}_{shift}^{RE}=6$, according to equation (1), it would be possible in LTE to allocate the same number of RSs to all RS RBs and at the same time allow all RE shifts in all RS RBs for $\overline{v}_{shift}^{RB} \in \{2,3,4,6,7,12,14,21,28,42\}$, for example, by mappings according to equations (2) or (3) above. The corresponding number of collisions are α={42,28,21,14,12,7,6,4,3,2}. For other values, these properties cannot in general be guaranteed. However, the mapping according to equation (4) might also produce good results in certain cases (for example, for $\overline{v}_{shift}^{RB}=7$.), although it gives poor mappings for the particular example of Table 1. For $\overline{v}_{shift}^{RE}=3$, the feasible sets will become $\overline{v}_{shift}^{RB} \in \{2,3,4,6,7,12,14,21,28,42,56,84,168\}$ and α={84,56,42,28,21,14,12,7,6,4,3,2,1}.

A particular problem is the case where the additional antenna ports (for example, for LTE-Advanced) cannot be assumed to utilize any RE shifts, contrary to the example shown in FIG. 3. RSs that are mapped to the same RS RB will then collide for the additional antenna ports, while the legacy antenna ports could still remain orthogonal since they could utilize different RE shifts. This can give rise to unequal measurement performance due to different interference situations among the antenna ports. For example suppose a RS RB where cell i and cell j are transmitting their RSs and RE shifts are only applied to the legacy antenna ports. Then, the RSs for cell i and j will collide for the additional antenna ports.

However, due to different RE shifts for the legacy antenna ports, cell i and cell j could have orthogonal RSs for the legacy antenna ports. To have a uniform inter-cell interference situation on the RSs, it would therefore be necessary to allocate the RSs to the RS RBs in such a way that the RSs also collide on the legacy antenna ports for the same cells as collision occurs for the additional antenna ports. In the example of Table 1, the mapping according to equation (4) would provide this, as all cell identities that are mapped to a certain RS RB shift have the same RS RE shift.

The problem is therefore to assign cell identities to RS RB shifts such that: there is an even distribution of the number of cells transmitting their RS in a RS RB, and as few RS RE shifts as possible should be supported in a RS RB.

Therefore, according to an embodiment of disclosure, the RB shifts are generated by constructing a p-periodic sequence of length $\overline{N}_{ID}^{cell}$ comprising elements $\{0,1,\ldots,\overline{v}_{shift}^{RE}-1\}$. Then, by judiciously selecting the period p, an even distribution of RS to RS RBs and few RE shifts to RS RBs could be provided by a one-to-one mapping between this sequence and the set of cell identities. For example, mapping (4) is one such solution.

Figure 4:
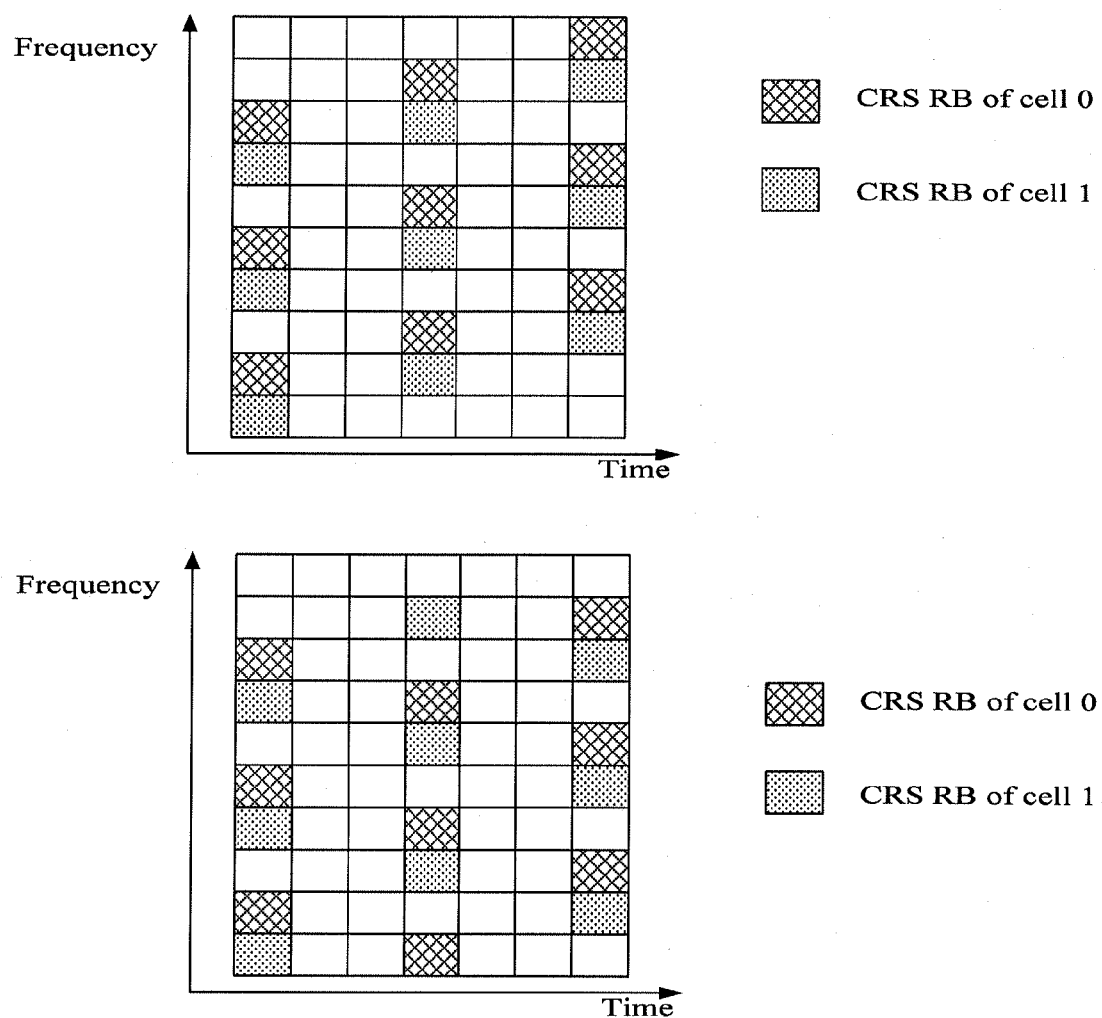
FIG. 4 shows an example of time-dependent RB shifts; with the same shift (top) and different shifts (bottom) in cell 0 and cell 1.

According to yet another embodiment of the disclosure, the cell-specific RB shift could vary in different sub-frames to further minimize the impact of RS-to-RS inter-cell interference. For example, a sub-frame dependent offset could be added such that the total RB shift in sub-frame n is given by, $$\tilde{v}_{shift}^{RB}(n,N_{ID}^{cell})=v_{shift}^{RB}(N_{ID}^{cell})+v(n) \quad (5),$$

for all cells. This is illustrated in the top of FIG. 4. Moreover, the time dimension n is not only confined to sub-frames, but could represent OFDM symbols, slots or radio frames. The offset sequence v(n) would be known by the receiver.

A more general approach is to allow cell-specific offsets such that the total RB shift in sub-frame n in cell $N_{ID}^{cell}$ is given by, $$\tilde{v}_{shift}^{RB}(n,N_{ID}^{cell})=v_{shift}^{RB}(N_{ID}^{cell})+v(n,N_{ID}^{cell}) \quad (6),$$

which is illustrated in the bottom of FIG. 4. A further option is to signal the value v(n) to the UE.

In some cases, there might be RBs that are not suitable for being RS RBs, for example, if they contain control or synchronization channels. Hence, additional constraints might be applied to the frequency shifts according to equations above (2)-(6) such that certain RBs are avoided or treated in a separate manner.

The above embodiments could be extended to the case where antenna ports are mapped to different RS RBs, i.e. different antenna ports in a cell have different RS RB shifts, respectively. This might reduce the performance impact to legacy UEs as it gives a lower RS density within the RS RBs, while the prize is paid for the legacy UEs as there are more RS RBs. Depending on the RS density within the RS RB, it might also be possible to utilize a different cell-specific RS RE shift on the additional RSs than for the legacy system. Hence, RS RE shifts could be made dependent on the RS (antenna port).

In the above examples, it has been assumed that the cells use the same time instant for transmitting the RSs. According to a further embodiment, the methods above are extended so that different sub-frames are used in different cells for the RS RBs.

For Co-ordinated Multi-Point (CoMP) transmission among cells, it might be beneficial if the base station (for example, eNodeB) is in direct control of the RS RB-shifts. A reason for this is that it could be desirable to transmit the RSs from the different co-operating cells on the same REs, in order to allow transmission of data from the different cells on the same REs. This facilitates precoding from different cells and combining the signals on the same RE. If RS from different cells are transmitted on different REs, the inter-cell interference will be low, but it will block any other cell from transmitting data on the REs used for RS transmission, thereby causing large overhead. Therefore, it should also be possible to signal explicitly the RS RB shifts (or information that would limit the available number of shifts for the UE) to the UEs receiving in CoMP mode.

As understood by the person skilled in the art, the method for generating RSs according to the disclosure, and methods for transmitting and receiving such RSs may be implemented in a computer having a CPU and related hardware. The computer implemented method runs in a computer and causes the computer to execute the steps of the method. The computer program is included in a computer readable medium of a computer program product. The computer readable medium may consist of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Furthermore, the methods above may be implemented in a device for generating RSs for a cellular wireless communication system, a device for transmitting, and a device for receiving such RSs.

It should also be understood that the present disclosure is not limited to the embodiments described above, but also relates to and incorporates all embodiments within the scope of the appended independent claims.

The invention claimed is:

1. A method for generating reference signals in a cellular wireless communication system having a set of resource blocks, each resource block comprising a plurality of resource elements, each reference signal being associated with an antenna port in a cell, and wherein at least one reference signal in a cell is transmitted on at least one resource element only in resource blocks belonging to a subset of said set of resource blocks, said method comprising:
frequency shifting the resource blocks belonging to said subset of resource blocks, wherein the frequency shifting of the resource blocks belonging to said subset of resource blocks is cell-specific and is determined from an integer sequence having a length less than or equal to a total number of cell identities in said cellular wireless communication system;
wherein said integer sequence is periodic, having a sequence length equal to said total number of cell identities and comprises elements from a set having $\bar{v}_{shift}^{RB}$ number of elements, wherein $\bar{v}_{shift}^{RB}$ denotes the total number of frequency shifts, of the resource blocks belonging to said subset of resource blocks, in number of resource blocks.

2. The method for generating reference signals according to claim 1, further comprising:
frequency shifting at least one resource element, on which said at least one reference signal is to be transmitted, within each resource block belonging to said subset of resource blocks, wherein the frequency shifting of said at least one resource element is cell-specific.

3. The method for generating reference signals according to claim 2, wherein resource elements, on which reference signals associated with different antenna ports in a cell, are frequency shifted differently within resource blocks belonging to said subset and/or said set of resource blocks.

4. The method for generating reference signals according to claim 1, wherein said reference signals are obtained from a reference signal sequence common to all antenna ports in a cell and unique for said cell.

5. The method for generating reference signals according to claim 1, wherein said integer sequence is determined from the set of cell identities.

6. The method for generating reference signals according to claim 1, wherein said integer sequence is determined from one of the following:

$$v_{shift}^{RB} = \mathrm{mod}\left(\left\lfloor \frac{N_{ID}^{cell}}{\bar{v}_{shift}^{RE}} \right\rfloor, \bar{v}_{shift}^{RB}\right),$$

$$v_{shift}^{RB} = \left\lfloor \frac{N_{ID}^{cell}}{\bar{N}_{ID}^{cell}/\bar{v}_{shift}^{RB}} \right\rfloor, \text{ and}$$

$$v_{shift}^{RB} = \mathrm{mod}(N_{ID}^{cell}, \bar{v}_{shift}^{RB}),$$

where $N_{ID}^{cell}$ denotes the cell identity, $\bar{N}_{ID}^{cell}$ denotes said total number of cell identities in said cellular wireless communication system, and mod is the modulus operator.

7. The method for generating reference signals according to claim 1, wherein said integer sequence at a time instant n is given by:

$$\tilde{v}_{shift}^{RB}(n, N_{ID}^{cell}) = v_{shift}^{RB}(N_{ID}^{cell}) + v(n), \text{ or}$$

$$\tilde{v}_{shift}^{RB}(n, N_{ID}^{cell}) = v_{shift}^{RB}(N_{ID}^{cell}) + v(n, N_{ID}^{cell}),$$

where $v_{shift}^{RB}(N_{ID}^{cell})$ is a function of the cell identity, $v(n)$ denotes a predetermined offset sequence for said cellular wireless communication system, and $v(n, N_{ID}^{cell})$ denotes a cell-specific offset sequence, respectively.

8. The method for generating reference signals according to claim 1, wherein the frequency shifting of the resource blocks belonging to said subset of resource blocks is performed so that the number of reference signals in each resource block belonging to said subset of resource blocks is the same.

9. The method for generating reference signals according to claim 1, wherein reference signals associated with different antenna ports in a cell are transmitted in the same, or different resource blocks belonging to said subset of resource blocks.

10. The method for generating reference signals according to claim 1, wherein a representation of said integer sequence is explicitly signalled in said cellular wireless communication system, or implicitly determined from the cell identity.

11. The method for generating reference signals according to claim 1, wherein reference signals for different cells are transmitted in different sub-frames, radio frames, slots or OFDM symbols.

12. The method for generating reference signals according to claim 1, wherein said reference signals are employed for channel estimation and/or demodulation in the downlink, and/or said cellular wireless communication system is a long term evolution, LTE, communication system or a long term evolution advanced, LTE-A, communication system.

13. A device for generating reference signals for a cellular wireless communication system having a set of resource blocks, each resource block comprising a plurality of resource elements, comprising:
- a processor configured to shift frequency in the resource blocks belonging to a subset of resource blocks, wherein each reference signal is associated with an antenna port in a cell, and wherein at least one reference signal in a cell is transmitted on at least one resource element only in resource blocks belonging to said subset of said set of resource blocks, and wherein the frequency shifting of the resource blocks belonging to said subset of resource blocks is cell-specific and is determined from an integer sequence having a length less than or equal to a total number of cell identities in said cellular wireless communication system;
- wherein said integer sequence is periodic, having a sequence length equal to said total number of cell identities and comprises elements from a set having $\bar{v}_{shift}^{RB}$ number of elements, wherein $\bar{v}_{shift}^{RB}$ denotes the total number of frequency shifts, of the resource blocks belonging to said subset of resource blocks, in number of resource blocks.

* * * * *